United States Patent
Shepherd et al.

(10) Patent No.: US 6,754,025 B1
(45) Date of Patent: Jun. 22, 2004

(54) DISK DRIVE SPINDLE MOTOR SPEED AND TIMING CONTROL

(75) Inventors: Stanley H. Shepherd, Morgan Hill, CA (US); Michael Anthony Moser, San Jose, CA (US); Yakov Lifchits, San Jose, CA (US); Ching-Tzuen Tarn, San Jose, CA (US); Mohamad A. Rezvani, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/482,157

(22) Filed: Jan. 12, 2000

(51) Int. Cl.[7] .............................. G11B 15/46; G11B 5/09
(52) U.S. Cl. .............................. 360/73.03; 360/77.08; 360/51
(58) Field of Search .......................... 360/77.08, 73.01, 360/73.03, 71, 70, 48, 51, 78.14

(56) References Cited

U.S. PATENT DOCUMENTS

| | | | |
|---|---|---|---|
| 4,669,004 A | 5/1987 | Moon et al. ................ 360/77 |
| 5,027,241 A | 6/1991 | Hatch et al. ............... 360/105 |
| 5,084,791 A | 1/1992 | Thanos et al. ............ 360/77.04 |
| 5,170,299 A | 12/1992 | Moon ..................... 360/77.08 |
| 5,255,136 A | 10/1993 | Machado et al. ......... 360/77.02 |
| 5,258,933 A | 11/1993 | Johnson et al. ............ 364/602 |
| 5,260,703 A | 11/1993 | Nguyen et al. ............ 341/100 |
| 5,341,249 A | 8/1994 | Abbott et al. ................ 360/46 |
| 5,384,671 A | 1/1995 | Fisher ........................ 360/51 |
| 5,517,631 A | * 5/1996 | Machado et al. .......... 395/438 |
| 5,583,705 A | * 12/1996 | Ziperovich et al. .......... 360/45 |
| 5,986,426 A | * 11/1999 | Rowan ....................... 318/599 |

* cited by examiner

Primary Examiner—Andrew L. Sniezek (57) ABSTRACT

A spindle motor control for a disk drive including a spindle motor for rotating a data disk at a desired rotational speed, and a data transducer head positionable relative to selected ones of a multiplicity of concentric data tracks formed on a data storage surface of the data disk by a head position actuator structure operating within a head position servo loop, wherein the concentric data tracks are periodically interrupted by a plurality of servo sectors per rotation, each servo sector recorded with head position information. The spindle motor control includes: a servo detector for detecting the head position information in at least one servo sector on a selected track under the transducer head in relation to a timing signal at a reference frequency; a position detector for determining the circumferential position of the detected head position information on the selected track in relation to the timing signal; and a controller for controlling the rotational speed of the spindle motor as a function of said circumferential position, to regulate the circumferential position of the transducer in relation to the servo sectors on the data tracks.

20 Claims, 6 Drawing Sheets

DISK DRIVE SPINDLE MOTOR SPEED AND TIMING CONTROL

FIELD OF THE INVENTION

The present invention relates to spindle motor control in disk drives, and more particularly, to regulating variations in spindle motor speed.

BACKGROUND OF THE INVENTION

In many processing and computing systems, magnetic data storage devices, such as disk drives are utilized for storing ever-increasing amounts of data per unit storage area of the disk drive. A typical disk drive includes a spindle motor having a rotor for rotating a data disk, and an actuator for moving a head carrier that supports transducer (read/write) heads radially across the disk to write data to or read data from concentric data tracks on the disk. A motor controller regulates drive currents to the motor to rotate the disk.

The amount of the "raw" capacity of a disk can be represented as the product of the allowable bit density (i.e., the density of flux changes along a track, such as bits per inch), the allowable track density (e.g., tracks per inch), and the total usable area of the disk. The ratio of user data that can be stored on the disk compared to the raw capacity (i.e. data format efficiency) is less than 100% because a portion of the raw capacity is devoted to servo information, servo addresses and data identification. Further, another portion of the raw capacity is devoted to inter-sector "padding" such as guard-bands and buffer zones. In particular, a buffer zone is provided between sequential data sectors on each track to protect against overwriting of user data on the disk due to spindle-speed variations relative to a reference clock for writing data. This is because during a data-write operation the spindle motor speed can vary, and if the variance is substantial relative to the reference clock, data will be written out-of-position on a track, overwriting the preceding or succeeding data sectors on that track.

With the ever-increasing need for additional data capacity for storing user data in disk drives, some disk drives utilize increased flux transition density within each data track on the data disks to increase the data format efficiency. Further, the data tracks are made narrower and recorded closer together. However, the increasing bit and track densities require complex transducer heads and data transfer channels. As such, in some disk drives the data capacity is increased by reducing the inter-sector padding to improve the disk's data format efficiency and to increase the data capacity of the disk drive for storing user data. To prevent data overwrites due to reduced padding, the spindle speed is monitored based on rotor position information from the motor, such as spindle index mark, to reduce spindle speed variations, and the transducer position on each track is detected to inhibit data-writes during out-of-speed conditions. A sensor detects the time of arrival of the spindle index mark once per revolution, and that information is used by a spindle motor controller to provide motor currents to attempt a nearly uniform rotational speed.

However, a major disadvantage of such disk drives is that the motor controller regulates the spindle motor current based on spindle position information detected once per revolution. This sparse, once per revolution, position information provides for only very coarse speed regulation and, therefore, reduction in spindle speed variation is limited. As such, the inter-sector padding can only be marginally reduced. There is, therefore, a need for a method and apparatus for regulating the spindle speed in a disk drive which provides for substantial reduction in inter-sector padding, thereby increasing the data capacity of the disk drive.

BRIEF SUMMARY OF THE INVENTION

The present invention satisfies these needs. In one embodiment, the present invention provides a spindle motor control for a disk drive including a spindle motor for rotating a data disk at a desired rotational speed precisely regulated by the spindle motor control, and a data transducer head positionable relative to selected ones of a multiplicity of concentric data tracks formed on a data storage surface of the disk drive. The concentric data tracks are periodically interrupted by a plurality of servo sectors per rotation, where each servo sector recorded with head position information. The spindle motor control includes: (a) a servo detector for detecting the head position information in at least one servo sector on a selected track under the transducer head in relation to a timing signal at a reference frequency; (b) a position detector for determining the circumferential position of the detected head position information on the selected track in relation to the timing signal; and (c) a controller for controlling the rotational speed of the spindle motor as a function of said circumferential position, to regulate the circumferential position of the transducer in relation to the servo sectors on the data tracks.

The head position information in each servo sector includes servo burst signals recorded at said reference frequency, and the servo detector detects at least one servo burst signal in a servo sector on the selected track via the transducer head and generates a readback signal. The position detector can further include a burst phase detector for determining a burst phase of the readback signal relative to the timing signal, said burstphase comprising the phase-angle between the readback signal and the timing signal. The controller controls the rotational speed of the spindle motor to regulate said burst phase, such that the frequency of rotation of the data disk is a function of the reference frequency.

In one embodiment, each servo burst signal includes at least one substantially cyclical signal at said reference frequency, wherein the servo detector further includes sampling means for sampling the cyclical signal a multiplicity of times for at least one cycle of the cyclical signal at a sampling rate related to the reference frequency to provide data samples such that said readback signal includes said data samples. The burst phase detector can include means for performing a Fourier transform of the data samples to provide a phase of the cyclical signal as the burst phase. Preferably, the means for performing the Fourier transform performs a single-frequency Fourier transform of the data samples at said reference frequency to provide a phase of the cyclical signal as the burst phase.

In one example, the sampling means samples the cyclical signal at least at about 0, 90, 180 and 270 degrees for at least one cycle of the cyclical signal. The position detector includes: (i) a first difference means for subtracting the data sample at 180 degrees from the data sample at 0 degrees to generate a first difference value, and (ii) a second difference means for subtracting the data sample at 270 degrees from the data sample at 90 degrees to generate a second difference value. The burst phase detector includes means for calculating the arc-tangent of the first and the second difference values to ascertain said burst phase. Further, the controller controls the rotational speed of the spindle motor to achieve a desired burst phase such as zero.

In another aspect the present invention provides a disk drive including said spindle motor control. Yet, in another aspect the present invention provides a method of performing spindle speed control in the disk drive by performing steps including: positioning the transducer head over a selected track; detecting the head position information in at least one servo sector on the selected track under the transducer head in relation to a timing signal at a reference frequency; determining the circumferential position of the detected head position information on the selected track in relation to the timing signal; and controlling the rotational speed of the spindle motor as a function of said circumferential position, to regulate the circumferential position of the transducer in relation to the servo sectors on the data tracks.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1:
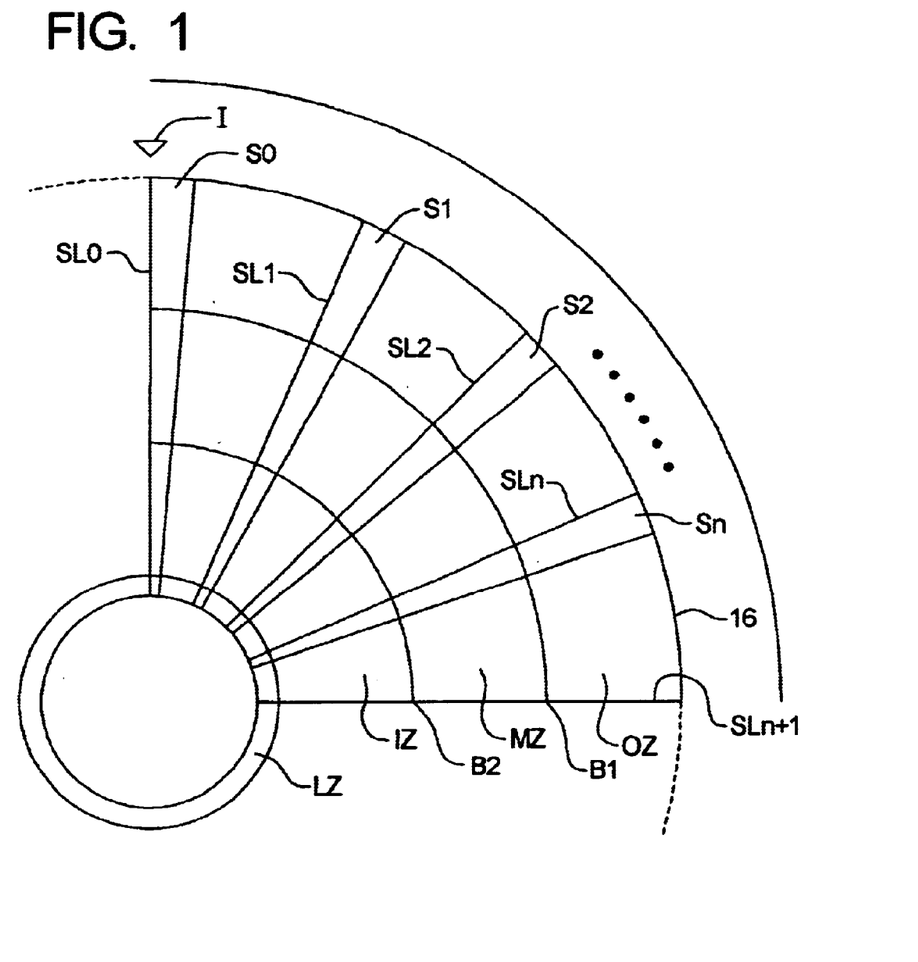
FIG. 1 shows an example layout plan of a quadrant of a data storage disk incorporating a servo data pattern within a zoned data recording scheme in accordance with principles of the present invention.
Figures 3, 4:
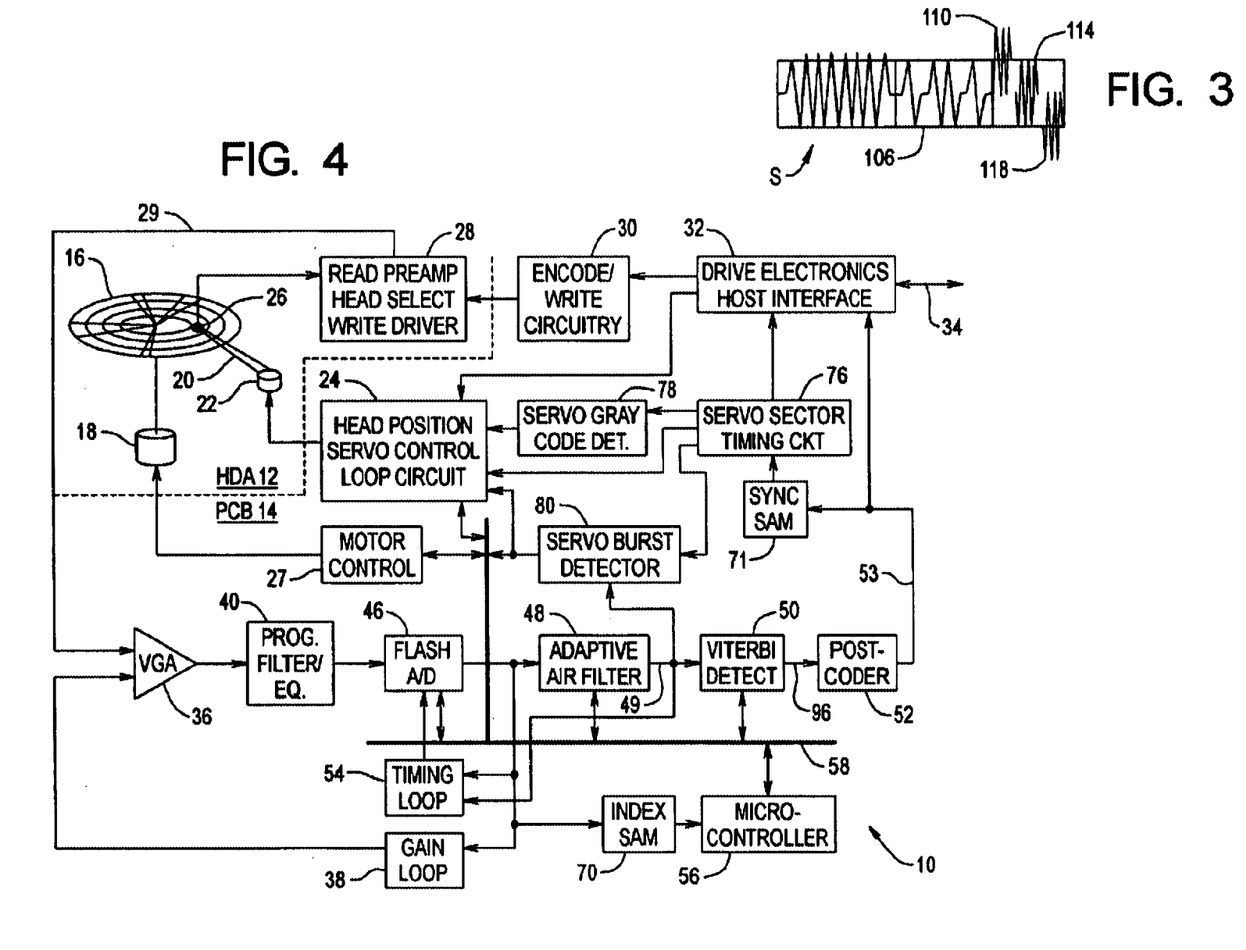
FIG. 3 shows an enlarged diagrammatic representation of example flux transitions comprising one of the embedded servo sectors of the FIGS. 2A–B data layout plan.
FIG. 4 shows an overall block diagram of a hard disk drive incorporating a servo detection scheme in accordance with the FIG. 1 layout plan and in accordance with principles of the present invention.

With reference to FIGS. 1 and 4, in one embodiment the present invention provides an exemplary disk drive 10 comprising a head and disk assembly ("HDA") 12, at least one electronics circuit board (PCB) 14, and a data storage disk 16. The disk 16 defines a multiplicity of concentric magnetic data storage tracks in which serial blocks of user data are sequentially recorded. In practice a hard disk drive may include up to eight or more data storage disks mounted in a stacked apart relation on a rotating disk spindle. The disk 16 is rotated at a regulated angular velocity by a speed-regulated spindle motor 18 controlled by spindle motor control/driver circuit 27. An in-line data transducer head stack assembly 20 is positioned e.g. by a rotary voice coil actuator 22 which is controlled by head position servo loop driver circuit 24.

Data transducer heads 26 of the head stack assembly 20 are associated in a "flying" relationship over a particular disk surface of each disk 16. The head stack assembly 20 thus positions e.g. thin film data transducer heads 26, relative to selected ones of a multiplicity of concentric data storage tracks defined on each storage surface of the rotating disk 16. Other types of heads 26 such as MiG heads or inductive write/magneto-resistive read head structures, for example, can also be utilized.

The heads 26 are positioned in unison with each movement of the actuator 22 and head stack assembly 20, and the resulting vertically aligned, circular data track locations across multiple data storage surfaces are frequently referred to as "cylinders" in the disk drive art. The storage disk 16 may be an aluminum alloy or glass disk which has been e.g. sputter-deposited with a suitable multi-layer magnetic thin film and a protecting carbon overcoat in conventional fashion, for example. Other disks and magnetic media may be employed, including plated media and, or spin-coated oxide media.

With reference specifically to FIG. 1, in one example embodiment, the data storage surface of each disk 16 is divided into three exemplary zones of concentric data tracks: an outer zone OZ, a middle zone MZ, and an inner zone IZ. An innermost landing zone LZ is also illustrated which is used in conventional fashion for contact stop/start recording. When the data storage disk 16 is rotated at a constant predetermined velocity, by using zoned data recording techniques, more optimum storage of data on the data disk 16 is achieved, with nominal data transfer rates for each zone being adapted to disk radius. While in the present example only three zones are illustrated, in practice as many as 16 or more data zones per data storage surface are preferred.

In practical terms a two times data clock difference may be realized between the data transfer rate at the outermost zone OZ and the data transfer rate at the innermost zone IZ. In the present example, the data written in tracks of the outer zone OZ may be written at a data clocking rate of 90 MHZ. The data written in tracks of the middle zone MZ may be written at a data clocking rate of e.g. 66.67 MHZ. And, completing this example, the data written in the tracks of the radially innermost data zone IZ may be written at a clocking rate of e.g 45 MHZ.

Each zone may include as many as 100–200 or more concentric data tracks in which data blocks are broken up and divided into segments by a multiplicity of regularly spaced apart embedded servo sectors S, there being four such servo sectors S0, S1, S2 and Sn depicted in FIG. 1. Typically, there may be as many as 100 servo sectors (or more) defined on each data storage surface, depending upon the amount of head positioning servo information required by the head position servo loop in order to ensure reliable track following during data reading and writing operations.

In the data arrangement exemplified by FIG. 1, the disk 16 is rotated in a counterclockwise direction relative to the heads 26. In this example, all servo sectors thus begin at substantially continuous radial sector lines SL which are evenly spaced apart circumferentially around the disk 16. This sector line arrangement simplifies the timing required for locating and properly sampling the head position information included within each servo sector. Five such sector lines are shown in the FIG. 1 diagram: SL0, SL1, SL2, SLn and SLn+1. One of the sector lines e.g. SL0, marks the beginning (and end) of all of the circular data tracks and provides a once per revolution index marker I for marking a once-per-revolution index position of the rotating data storage disk 16 relative to the non-rotating data transducer head 26.

A data clock is set to the clocking rate of each zone for writing user-data during normal operation. In this example embodiment, the head positioning information in each servo sector S is recorded at a reference servo sector data rate that can remain the same, or vary, across the data zones. Where the servo sector data rate varies across data zones, there can be discontinuous zone boundary regions located between adjacent data track zones including servo sectors. For example, a zone boundary B1 is between the outer zone OZ and the middle zone MZ; and, a zone boundary B2 is between the middle zone MZ and the inner zone IZ. Increasing the servo sector data rate across the zones allows servo data compaction or reduction in storage area otherwise required by the embedded servo sectors S. Greater savings of disk storage area may be realized in practice by employing a larger number of data zones than three. An additional, related benefit of a larger number of data zones is a smaller difference in servo data rate frequency from one zone to the next. In either case, a data sampling servo clock 126 is set to match the servo sector data rate frequency for providing a timing signal to detect head position information in relation thereto.

Figure 2A:
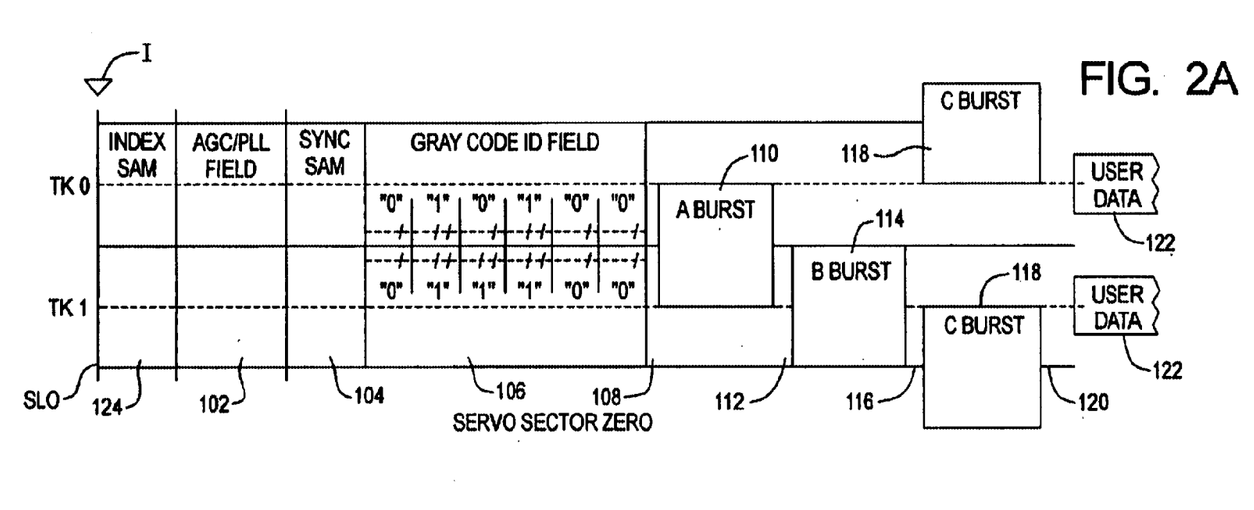
FIGS. 2A–B shows an enlarged, diagrammatic depiction of an example servo sector data structure within the disk layout plan of FIG. 1.

Referring to FIG. 2A, a single servo sector location S0 at two adjacent data racks, TK0 and TK1, of a particular data zone are shown. In this depiction, both of the tracks TK0 and TK1 are shown to share an AGC/PLL field 102. In addition, each track includes a synchronous servo address mark field 104, a synchronous Gray coded track identification field 106, and adjacent tracks share three circumferentially staggered and radially offset constant frequency burst fields 110, 114, and 118, designated as A BURST, B BURST and C BURST, respectively. The burst fields 110, 114 and 118 are separated from themselves and other fields by guard fields 108, 112, 116 and 120. The burst fields 110, 114 and 118 provide servo fine position information utilized by the servo control 24 for fine radial positioning of the head 26 over the disk tracks.

The disk drive 10 incorporates a write/read channel with synchronous servo detection. The burst fields 110, 114 and 118 are sensed by the head 26, sampled by the read channel and amplitude detected. The burst amplitudes are then used by the servo control 24 for fine radial positioning of the head 26 over the disk tracks. FIG. 3 shows an enlarged diagrammatic representation of example flux transitions comprising one of the servo sectors S of the FIGS. 2A–B data layout plan. Each of the burst fields 110, 114, and 118 can comprise one or more cyclical signals such as e.g. ¼ T sine wave patterns. In one example, each servo burst field includes eight to sixteen sinewave cycles.

The user data field begins (or resumes) at field 122 following the servo sector S0. This first servo sector S0 also includes an asynchronous index servo address mark ("SAM") 124, so that the beginning of the data tracks may be detected from the disk surface during drive initialization and initial calibration, when the synchronous data channel is not yet synchronized to information on the data surface of the disk 16.

Preferably, the asynchronous index servo address mark pattern 124 includes several very long magnetic domains unlike any other data patterns on the disk, and which can be readily detected by asynchronous operation of the data channel during initialization, so that a rough starting point for locating following servo sectors may be obtained. By placing the asynchronous index servo address mark 124 at the beginning of the AGC/PLL field 102 in the first sector S0, a space which is otherwise unusable because of Barkhausen noise during normal data write/read operations becomes very useable and valuable during the initial power up sequence, when no data writing operations are being carried on at the disk drive 10.

Figure 2B:
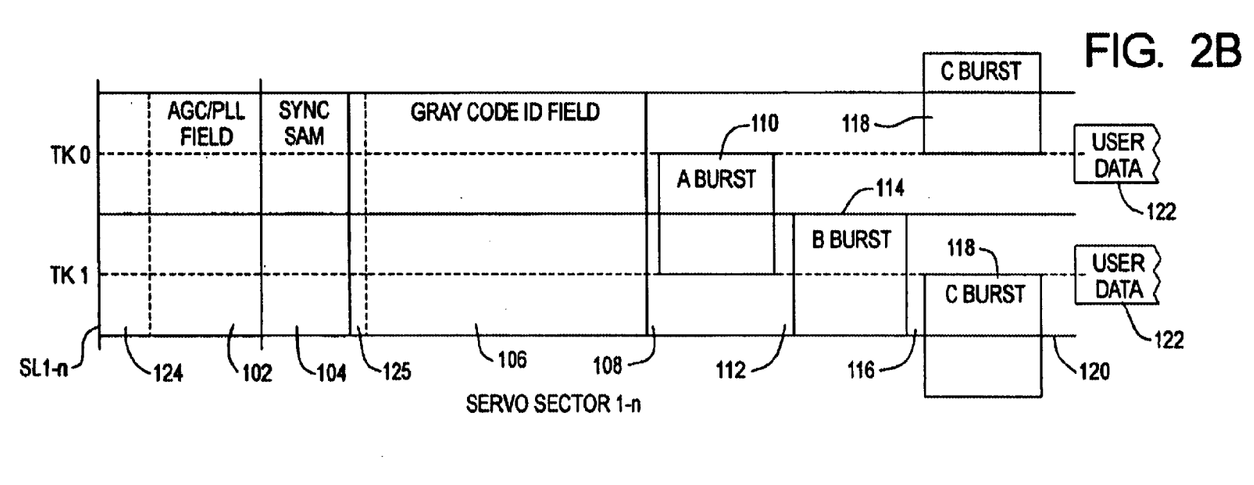

FIG. 2B depicts sector location S1, which is identical in length and layout as sector S0, except that the asynchronous index servo address mark 124 may optionally be eliminated in the AGC/PLL field 102. The sector S1 is representative of all of the servo sectors S, except for the first sector S0 which includes the asynchronous index servo address mark 124. Since the asynchronous servo mark 124 is at the beginning of the AGC/PLL field 102 of the index sector S0, most, if not all, Barkhausen noise disturbances will occur in that particular region when the data head 26 transitions from writing to reading as the servo sector S0 is reached. Since the servo address mark 124 has been found during initial calibration, the presence of Barkhausen noise is not detrimental to ongoing servo operations.

An asynchronous servo address mark field 124 may optionally be included in all of the servo sectors at the beginning of the AGC/PLL field, and an index bit added to the Gray coded track identification number field 106. In this alternative embodiment, the Gray code detector 78 also detects the once-per-revolution index bit and signals index found to the microcontroller 56, while an asynchronous SAM detector 70, detects each of the fields 124 during initial startup calibration, thereby reducing rotational latencies in first detection of a servo sector. FIG. 2B shows the asynchronous servo address mark field 124, and a Gray coded index bit position 125 in dashed lines.

With reference to FIG. 4, the HDA 12 can have a wide variety of embodiments and sizes. One example of a suitable HDA is given in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned U.S. Pat. No. 5,255,136. The disclosures of these patents are incorporated herein by reference thereto.

A head selectread channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14.

The electronics PCB 14 physically supports and electrically connects the disk drive electronic circuitry needed for an intelligent interface disk drive subsystem, such as the disk drive 10. The electronics circuitry contained on the PCB 14 includes encode/write circuitry 30, drive electronics including a host interface 32 and a disk drive-host bus structure 34 over which commands and data are passed from a host (not shown), and status and data are passed from the disk. The drive electronics 32 includes e.g. a sequencer, an encoder-decoder/serializer-deserializer ("ENDEC/SERDES"), error-correcting-code ("ECC") circuitry, a precoder, a cache buffer controller, a cache buffer memory array, and a high level interface controller implementing a bus level interface structure, such as SCSI II target, for communications over a bus with a SCSI II host initiator adapter within a host computing machine (not shown).

A programmed digital microcontroller 56 includes a microbus control structure 58 for controlling data formatting and data transfer operations of the sequencer and data block transfer activities of the interface in the drive electronics 32, and for controlling head positioning of the actuator structure 20 via a servo loop including the head 26, the preamplifier 28, said synchronous data channel, and the servo control 24. The microcontroller 56 also controls the spindle motor controller 27.

The synchronous read/write channel utilizes a "partial response, maximum likelihood detection" or "PRML" signaling technique. PRML synchronous data detection channels frequently employ analog-to-digital converters such as e.g. six-bit flash analog-to-digital converters for providing synchronous samples of the analog signal read from the storage medium. One example of a PRML synchronous data detection channel is found in commonly assigned U.S. Pat. No. 5,341,249, entitled: "Disk Drive Using PRML Class IV Sampling Data Detection with Digital Adaptive Equalization", the disclosure thereof being incorporated herein by reference. Synchronous servo detection methods within synchronous user data detection channels such as PRML provide increased burst accuracy as well as more efficient embedded servo sector patterns.

Further, because a PRML synchronous data detection channel includes at least one high speed analog-to-digital converter within the read channel, it is desirable to use the same converter for both user data and servo position estimation, thereby eliminating additional and/or complex hardware which would add to storage device cost. The channel analog-to-digital converter is selected to have sufficient bits conversion resolution to be satisfactory for data signal quantization within the PRML synchronous sampling data detection scheme, and for servo fine position information quantization (i.e. servo burst demodulation).

Referring to FIG. 4, signals induced into the head 26 are amplified by the read preamplifier 28 into an analog signal stream which is passed to a variable gain amplifier ("VGA") 36 along a path 29 for controlling the gain of the analog signal stream on the path 29. The gain controlled signal stream is then passed to the PRML data channel including an analog programmable filter/equalizer 40, a flash analog-to-digital converter 46, a digital adaptive finite impulse response filter 48, a Viterbi detector 50, and a postcoder 52. A dual mode gain control loop 38, and a dual mode timing loop 54 also provide important functions within the PRML data channel. All of these elements together comprise a highly efficient PRML data channel of a type described in the referenced, commonly assigned, U.S. Pat. No. 5,341,249.

In operation, magnetic flux transitions sensed by the selected data transducer head 26 are preamplified as an analog signal stream by the read preamplifier circuit 28. The preamplified analog signal stream is then sent through the path 29 to the VGA 36 for controlled amplification. Thereafter, the analog signal stream is passed from the VGA 36 through the programmable analog filter/equalizer 40. The analog filter/equalizer 40 is programmed so that it is optimized for the data transfer rate of the selected data zone or servo sector from within which the transducer head 26 is reading data. The equalized analog read signal is then subjected to sampling and quantization within the high speed flash analog to digital (A/D) converter 46 which, when synchronized to user data rate or servo data rate, generates raw digital data samples $X_K$. The A/D converter 46 is provided with a suitable resolution, which is at least six bits, and more preferably, eight bits per data sample $X_K$.

The data samples $X_K$ are passed through the FIR filter 48 which employs adaptive filter coefficients for filtering and conditioning the raw data samples $X_K$ in accordance e.g. with desired PR4 channel response characteristics in order to produce filtered and conditioned samples $Y_K$. The bandpass filtered and conditioned data samples $Y_K$ leaving the FIR filter 48 are then passed over a path 49 to the Viterbi detector 50 which decodes the data stream, based upon the Viterbi maximum likelihood algorithm employing a lattice pipeline structure implementing a trellis state decoder, for example. At this stage, the decoded data put out on a path 96 by the detector 50 is passed through a postcoder 52 which restores the original binary data values.

During user data block reading operations from the user data storage regions of the disk 16, the binary data values are deserialized by the ENDEC/SERDES in the drive electronics 32, wherein the ENDEC/SERDES frames and puts out e.g. eight bit user bytes in accordance with an inverse of the ⅛the rate coding convention (nine code bits for every eight user data bits). The ENDEC/SERDES can be in accordance with commonly assigned U.S. Pat. No. 5,260,703. The decoded user bytes are then passed to a sequencer in the drive electronics 32, and handled thereafter conventionally, in accordance with the methods explained in commonly assigned U.S. Pat. No. 5,255,136, referred to above.

The raw data samples $X_K$ must be taken on the incoming analog signal waveform at precisely proper, regular locations. Accordingly, the dual mode timing loop 54 is preferably provided to control the frequency and phase of the flash analog-to-digital converter 46. The timing loop 54 can include an analog timing control circuit, and a digital timing control circuit and a timing DAC (not shown). The timing loop is described in commonly assigned U.S. Pat. No. 5,258,933, the disclosure thereof being incorporated herein by reference.

The servo fields 102, 104, 106, 110, 114, 118 and 124 are written following drive assembly and checkout at the factory by a servo writer apparatus. Embedded servo fields may be written by a servo writer, preferably in accordance with the methods described in a commonly assigned U.S. Pat. No. 5,170,299, entitled "Edge Servo For Disk Drive Head positioner", the disclosure thereof being hereby incorporated by reference. Writing user data to the disk 16 requires a write channel. The write channel includes the ENDEC/SERDES and precoder in drive electronics 32, the write driver 30 including a write precompensation circuit, and a frequency synthesizer within the timing loop 54 as described in the commonly assigned U.S. Pat. No. 5,384,671 entitled "PRML sampled data channel synchronous servo detector", the disclosure thereof being hereby incorporated by reference.

As aforementioned, detection of an index SAM 124 occurs only during a power-on calibration routine. When the index SAM pattern 124 matches the pattern programmed into the asynchronous SAM detector logic 70, an "index SAM found" signal is asserted. The microcontroller 56 proceeds with initial calibration by starting a servo sector timing circuit 76 which is used to establish timing windows for the servo sectors. Once the servo sectors are located, a process of synchronizing the PRML channel to the disk data begins by reading the AGC/PLL field 102 of each servo sector S. This enables decoding of the synchronous SAM pattern 124 and the Gray coded coarse head positioning information. Once this information is available, the microcontroller 56 may command seeks to desired track locations, and continue with the initialization process. After the index SAM 124 is located during the initial calibration routine, the output from the index SAM detector 70 is unnecessary, as the servo sector timing circuit 76 marks the index sector 124 in time. In the event that spin-down occurs during a power saving mode, or in the event of a spindle speed error, a calibration routine is invoked, and once again, the index SAM(s) 124 are located, thereby to locate at least one servo sector and begin radial head positioning and recovery of the data from the disk 16.

A synchronous servo decoder 71 is also connected to the PRML channel e.g. at the postcoder output 53 to decode the synchronous servo field 104. The synchronous SAM decoder 71 comprises simple pattern recognition logic which recognizes the unique synchronous pattern 104 within the post coded (decoded) data stream. The SAM decoder 71 can be provided with fixed or programmable fault tolerance in detecting the synchronous pattern 104. Upon detection of each servo mark in the field 104, a signal resynchronizes a sector interval timer within the servo sector timing circuit 76. The timing circuit 76 provides timing signals to control the servo Gray code decoder circuit 78 and a servo burst detector circuit 80. Details of the SAM decoder 71, servo sector timing circuit 76 and servo Gray code detector 78 are given in the referenced U.S. Pat. No. 5,384,671 referred to above.

The microcontroller 56 controls the programmable analog filter/equalizer 40, the adaptive FIR filter 48, the Viterbi detector 50, the timing loop 54, and the gain loop 38. The micro-controller 56 is provided with direct access to the DRAM memory and may also include internal and/or external program memory, as may be required or desired. As the burst fields 110, 114 and 118 are induced into the head 26, they are amplified by the circuit 28, sampled by the PRML channel and provided to the servo burst detector 80 to determine the amplitude of burst fields. The amplitude information is used by the servo control 24 for fine radial positioning and tracking of the head 26 over the disk tracks. The printed circuit board 14 can additionally carry circuitry related to the head positioner servo 24 including e.g. a separate microprogrammed digital signal processor ("DSP") (not shown) for controlling head position based upon detected actual head position information supplied by the servo burst detector 80 and desired head position supplied by the microcontroller 56.

The rate of the data sampling servo clock 126 is set to match the servo sector data rate. Where the servo sector data rate varies across the data zones, during track seeking operations, the data sampling servo clock 126 can be reset by the microcontroller 56 to the relevant zone's servo sector data rate as the transducer head 26 moves from one zone to the next. In that case, during the moment that the head 26 is crossing a particular zone boundary B, servo position information is unavailable from the disk, and the servo loop is operating "open loop", based upon estimated parameters, such as position, radial velocity, and actuator driving current, which were derived from previous head position samples taken from the servo sectors and any other bias forces tending to affect head position while it is crossing the particular zone boundary.

Using the data sampling servo clock 126 as a reference timing signal of the same frequency as the burst waves, the PRML channel samples the burst field waveforms 110, 114 and 118 many times per burst waveform cycle. Specifically, the servo clock 126 is provided to the analog-to-digital converter 46 for sampling and quantizing the burst waves at a quantization rate related to the frequency of the reference signal from the servo clock 126. The burst amplitude can be determined by "Digital Fourier Transform" of the samples. This technique provides substantial noise rejection because only a single frequency (i.e. the frequency of the written pattern) is enhanced, while other frequencies are reduced by averaging many samples.

Specifically, the servo burst detector 80 effectively applies a single-frequency Fourier transform to the conditioned quantization values $Y_K$ from the output of the FIR filter 48, to generate summed "sine" and "cosine" terms. The magnitude of the sine and cosine terms is the magnitude of the signal multiplied by, respectively, the trigonometric sine and cosine of the phase-angle between the sine waves in the burst field and an independent reference signal (i.e., data sampling servo clock) of the same frequency as the sine waves. The total amplitude of the frequency of interest is the square root of the sum of the squares of the "sine" and "cosine" terms. The burst amplitudes are utilized by the servo control 24 for fine radial positioning of the head 26 over tracks on the disk 16.

The data samples are further utilized by the servo burst detector 80 to determine a difference between the phase of the burst waveforms and the phase of the data sampling servo clock 126 utilized for sampling the burst wave forms. The servo burst detector 80 effectively measures the time that the burst waveforms circumferentially appear under the head 26 relative to the time cycles of the data sampling servo clock 126. This phase/timing information is utilized in a motor speed control loop including the head 26, the PRML channel, the detector 80, the micro controller 56 and the motor control 27 to precisely adjust the spindle motor rotation frequency, or speed, as a function of the frequency of the data sampling servo clock 126. This reduces variations between the motor speed and the speed of the data sampling servo clock, and therefore, reduces the chance that the head 26 is circumferentially out of position from the expected position over a selected track for transferring user data. With the finer measurement of the circumferential position of the head 26 relative to the burst waveforms, the spindle frequency can be controlled to match the data sampling servo clock frequency, thereby reducing the amount of spindle speed variation over a motor revolution by a significant factor. This substantially eliminates the need for any extra inter-sector padding between sequential data sectors on each track, and provides better utilization of disk space for user data storage.

In one example, the steps of sampling comprise sampling the cyclical burst wave signals N times per cycle of each burst wave signal to provide 0-th through (N−1)-th data samples. The burst phase is determined by: (a) generating a first difference by subtracting the (i+2)-th data sample from the i-th data sample; (b) generating a second difference by subtracting the (i+3)-th data sample from the (i+1)-th data sample, where i ranges from 0 to (N−1); and (c) calculating the arc-tangent of the first and the second difference to ascertain said burst phase. The index i ranges from 0 to (N−1), and the value N is greater than 0 and can be e.g. equal to four. Steps (a) and (b) are repeated for multiple cycles to generate corresponding multiple first and second differences, and the first differences are summed to obtain a sine-sum, and the second differences are summed to obtain a cosine-sum. Step (c) then further includes calculating the arc-tangent of the sine-sum and the cosine-sum to ascertain the burst phase.

Figure 5:
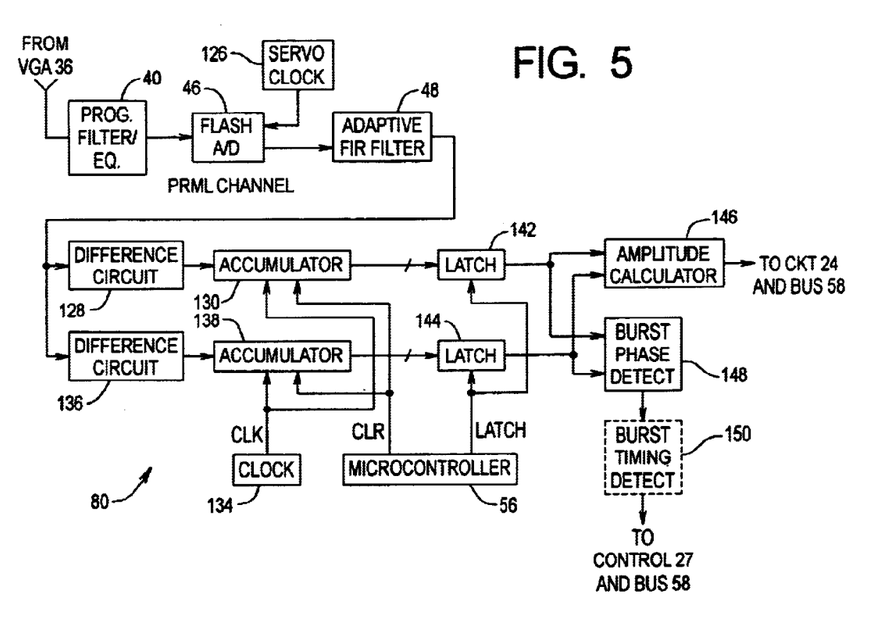
FIG. 5 shows a more detailed block diagram illustrating a servo burst detector of FIG. 4 in accordance with principles of the present invention.

FIG. 5 illustrates example circuitry for implementing the servo burst detector 80. Using the data sampling servo clock 126, having a clock rate of e.g. 1 T, the PRML channel samples each sinewave in a burst field e.g. four times per wave cycle such as at about 0, 90, 180 and 270 degrees, generating sample values $Y_K(0)$, $Y_K(90)$, $Y_K(180)$, $Y_K(270)$ output by the FIR filter 48, and the sample values are provided to the burst detector 80. The index K identifies each burst wave in a burst field, where K can vary from 1 up to the number of waves in a burst field e.g. 12 or 16. As such the burst waves are converted to discrete samples every 90 degrees, or 1 T of the clock 126.

The samples $Y_K(0)$ and $Y_K(180)$ are passed to a first difference circuit 128 to generate first difference values $(Y_K(0)-Y_K(180))$. The values $(Y_K(0)-Y_K(180))$ are then passed to a first accumulator 130, which accumulates the difference $(Y_K(0)-Y_K(180))$ for each wave K, wherein the accumulator 130 is clocked by a zone data clock 134 at a zone clocking rate of e.g. 4 T. The microcontroller 56 generates a CLEAR signal which clears the accumulator 130 before each burst field 110, 114, 118. In this way, the first accumulator 130 provides a sine-sum S(n) by summing all values $(Y_K(0)-Y_K(180))$ over one or more waves K in a burst field for a sample n, where n refers to a burst field 110, 114 or 118 in a servo sector S. As such, in one example, S(n) refers to the sum of all values $((Y_K(0)-Y_K(180))$ over all burst waves K in a burst field n, where n refers to a particular servo burst field such that "sample n" represents the sum of $Y_K$ samples for that burst field.

Similarly, the samples $Y_K(90)$ and $Y_K(270)$ are passed to a second difference circuit 136 to generate second difference values $(Y_K(90)-Y_K(270))$. The values $(Y_K(90)-Y_K(270))$ are then passed to a second accumulator 138, which accumulates the difference $(Y_K(90)-Y_K(270))$ for each wave K, wherein the accumulator 138 is clocked by the zone data clock 134. The CLEAR signal from the microcontroller 56 also clears the second register 140 before each burst field 110, 114, 118. In this way, the second accumulator 138 provides a cosine-sum C(n) by summing all values $(Y_K(90)-Y_K(270))$ over all waves in a burst field for a sample n.

For radial positioning of the head 26 over tracks, the microcontroller 56 signals start and end of each burst amplitude accumulation process by asserting CLEAR to clear the first and second accumulators 130, 138, and by asserting a LATCH signal to latch the accumulated sine-sum S(n) and cosine-sum C(n) values into first and second latches 142, 144, respectively. The sine-sum S(n) and cosine-sum C(n) values are passed to a burst amplitude calculation circuit 146 which determines a burst amplitude A(n) for a sample n by calculating the square-root of the sum value $((S(n))^2+(C(n))^2)$. The burst amplitude values are passed to the servo control 24 and the microcontroller 56 via the bus structure 58, for fine radial positioning of the head 26 over tracks on the disk 16.

For controlling the speed of the motor, said burst phase is determined by calculating the arctangent of the sine-sum S(n) and the cosine-sum C(n) values. The arc-tangent(S(n), C(n)) is an angle whose tangent function is equal to the value S(n)/C(n), and whose sine and cosine functions have the same signs, respectively as S(n) and C(n). Specifically, the value arc-tangent(S(n), C(n)) depends only on the phase of the burst waves relative to the data sampling servo clock 126. As such the sine-sum S(n) and the cosine-sum C(n) are passed to a phase detector 148 to calculate the burst phase as:

burst-phase(n)=arc tan(S(n), C(n)), in degrees, for example.

The burst phase value can then be passed to an optional burst timing detector 150 to determine the burst timing as:

burst-timing(n)=burst-phase(n)/(90 degrees per sample)*(servo-clock-period).

The values S(n), C(n) are identical to the sine and cosine of burst-phase-angle(n), multiplied by the burst amplitude A(n). The arctangent function can be calculated in the microcontroller 56 by e.g. a polynomial approximation, or using ASIC circuitry. Similarly, the burst-phase and burst-timing calculations can be performed by the microcontroller 56 or by an ASIC.

Figure 6:
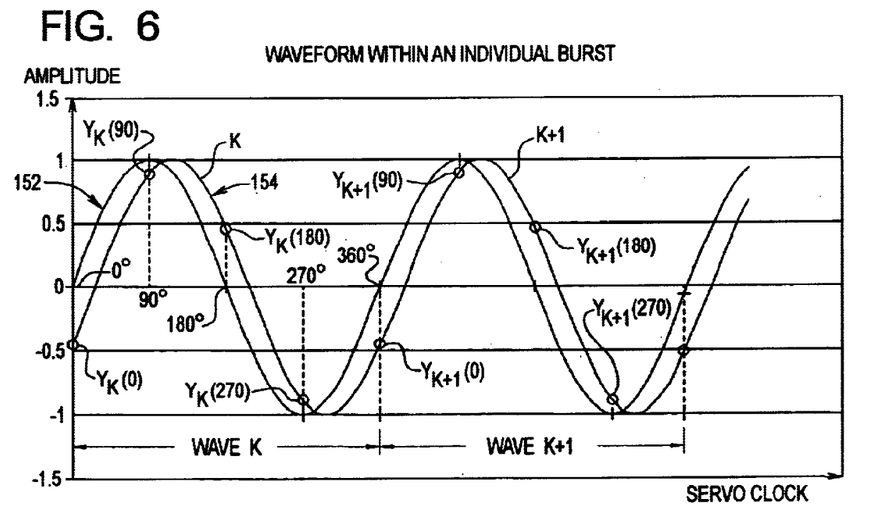
FIG. 6 shows example graphs of an expected burst wave form, relative to an actual burst wave form indicating a non-zero burst phase.

If the frequency of the data sampling servo clock 126 matches the motor rotational frequency, and the data sampling servo clock frequency and the motor rotational frequency are aligned phasewise, such that the peak amplitudes of the burst waves of the burst field are aligned with the timing signal wave from the measurement servo clock 126, the sample values $Y_K(90)$ and $Y_K(270)$ are expected to be at the top and at the bottom of the burst waveform cycle, respectively, and the sample values $Y_K(0)$ and $Y_K(180)$ are expected to be at the 0-crossings of the burst waveform cycle. Thus the value of the sine-sum S(n), the sum of differences $(Y_K(0)-Y_K(180))$, is zero, and the value of the cosine-sum C(n), the sum of differences $(Y_K(90)-Y_K(270))$, it at its maximum. In that case the phase difference between the burst waves and the data sampling servo clock 126 is zero. If the desired burst phase is zero, and the measured burst phase is e.g. +10 degrees, then the motor speed is adjusted as described below to reduce the measured burst phase (over the next few measurements) down to the desired level of zero. FIG. 6 shows example graphs of an expected burst waveform 152 representing the phase and frequency of the timing signal of the data sampling servo clock 126, relative to an actual burst wave form 154, indicating a non-zero burst phase. The sample values $Y_K(0)$, $Y_K(90)$, $Y_K(180)$ and $Y_K(270)$ for the actual burst wave form 154 are also shown, where K identifies one cycle of the burst wave 154, and K+1 identifies the next cycle of the burst wave 154. For the burst wave cycle K+1, the FIR filter 48 outputs sample values $Y_{K+1}(0)$, $Y_{K+1}(90)$, $Y_{K+1}(180)$, $Y_{K+1}(270)$. When the burst phase is zero, the waveforms 152 and 154 coincide.

The number of samples N per burst wave cycle can be other than the four samples described above. For example, sampling can be performed at only 0 and 90 degrees per burst wave cycle because the burst wave data samples at 180 and 270, $Y_K(180)$ and $Y_K(270)$, respectively, are essentially opposites of the data samples at 0 and 90, $Y_K(0)$ and $Y_K(90)$, respectively, except for a possible DC offset. However, using the difference values $(Y_K(0)-Y_K(180))$ and $(Y_K(90)-Y_K(270))$ per burst wave cycle, improves the signal-to-noise ratio ("S/N") by increasing the number of measurements as noise tends to average itself out. The S/N scales with the square root of the number of measurements, and as such doubling the number of measurements improves S/N by a factor of 1.414.

The above quadrature method for determining the burst phase is an instance of a Fourier transform, such as a single-frequency Fourier transform at the frequency of the burst waves. A single-frequency Fourier transform of the quantized samples provides the amplitude and phase of the burst wave signals. Further, a single-frequency Fourier transform for determining the burst phase can also be performed using different numbers of samples per burst wave cycle. A discrete Fourier transform ("DFT") of a series of quantized data samples taken at equal intervals throughout a burst wave can generate separate-and-independent phase and amplitude values for each of the frequencies from one-per-burst to one-per-two-samples. Therefore, preferably an exact number of samples per wave are taken, such that a single-frequency DFT can be performed at the exact frequency of the burst wave. Such a method completely rejects any "noise" that exists at each of said other frequencies. And, amplitude measurement methods utilizing "dual frequency" bursts can also be utilized to determine the burst phase for controlling the speed of the spindle motor 18.

The spindle motor 18 can be a three-phase brushless DC motor having multiple phase coils arranged as a stator, and a rotor having a permanent magnet for rotating the data disk 16. The motor 18 is commutated by sequentially energizing selected phase coils based on the location of the rotor relative to the phase coils. The energized coils generate forward torque inducing magnetic fields relative to the rotor magnet that rotate the rotor. The speed of the motor is a function of the amount of drive current in the motor coils.

Figure 7:
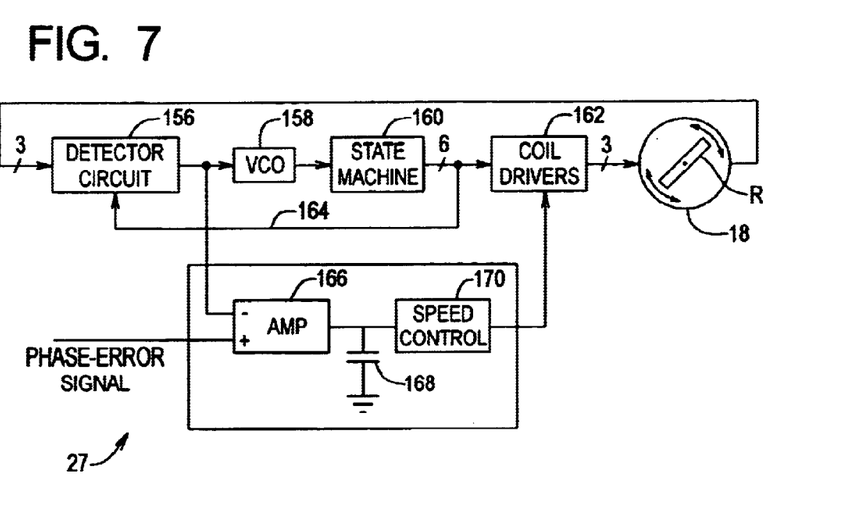
FIG. 7 shows a schematic block diagram of an embodiment of the motor control of FIG. 4 in accordance with principles of the present invention.

FIG. 7 shows a schematic block diagram of an embodiment of the motor control 27 for driving the motor 18. A detector circuit 156 senses the position of the rotor R and generates a corresponding voltage at its output. In response to the output voltage of the detector 156, a voltage controlled oscillator ("VCO") 158 generates a clock signal where the frequency of the clock signal is based on the level of the output voltage generated by the detector circuit 156. In response to the clock signals from the VCO 158, a finite state machine 160 commutates the motor 18 by generating control signals corresponding to six drive states for controlling six coil drivers 162. The drivers 162 can each be one of six high-current field effect transistors which operate as switches to selectively couple each of the three phase terminals of the motor 18 to an appropriate positive voltage or negative voltage. The finite state machine 160 thus generates six control signals, each coupled to control one of the drivers 162.

A feedback signal 164 couples the finite state machine 160 to the detector circuit 156 so that the detector circuit 156 knows which of the three motor terminals floats during the current drive state. The detector circuit 156 determines the position of the rotor R as a function of the voltage waveform on the floating terminal. The coupling of the three motor terminals to the inputs of the detector circuit 156 completes the formation of a phase locked loop. The phase locked loop ensures that the finite state machine 160 transitions from each drive state to a next drive state at an appropriate time according to a position or phase of the rotor R.

The output of the detector circuit 156 which is representative of the actual speed of the motor 100 is also coupled to an inverting input of a transconductance amplifier 166. A non-inverting input of the transconductance amplifier 166 is coupled to receive a signal, phase-error signal, that is representative of a desired driving torque of the motor 18. An output of the transconductance amplifier 166 is representative of a difference between the actual motor speed and the desired motor speed and is coupled to a capacitor 168 for forming a voltage across the capacitor 168. The voltage across the capacitor 168 is coupled to an input of a speed controller 170. The speed controller 170 generates a signal which is coupled to control the drivers 162. The signal from the speed controller 170 controls the speed of the motor 18 in a second feedback loop, by controlling the magnitude of the motor current. Accordingly, the speed control loop controls the amount of current in the motor windings and, hence, its speed. The phase locked loop controls the timing of the current switching in the motor windings and, thus, monitors the motor speed rather than controls the motor speed. The speed control loop and the phase locked loop are, however, interdependent.

The motor speed can be controlled through pulse width modulation or by linear control of the drivers 162. In the case of pulse width modulation, the duty cycle of the drive signals can vary from 0% (the motor coasts) to 100% (maximum torque). When the speed control loop is closed, variations in the inputs to the transconductance amplifier 166 cause the duty cycle (or voltage) to increase or decrease in order to reach, and hold, the desired speed. During spin-up, the high inertia of the motor 18 requires a high duty cycle (or voltage) in order to accelerate the spindle, whereas a low motor inertia results in a correspondingly lower duty cycle (or voltage).

Once the motor is spinning at constant speed, the motor inertia typically does not influence the duty cycle. The duty cycle (or magnitude of the drive signals, in the case of linear control) is proportional to the torque applied to the motor. As such, at constant RPM, this torque must match the drag torque of the spindle, not its inertia. When a phase difference ("phase-error") is detected, the motor speed is adjusted in order for the phase to change, and then the speed is restored in order for the phase to stop changing. The signal from the speed controller 170 has a magnitude corresponding to the driving torque. A phase-error measurement induces a temporary change in the desired speed, which may be compared to the spindle speed to determine a speed-error. The speed error in turn induces a temporary change in a "desired torque". The "desired torque" signal can be applied directly to a DAC to change the drive voltage, or to a PWM to change the drive duty-cycle.

Figure 8:
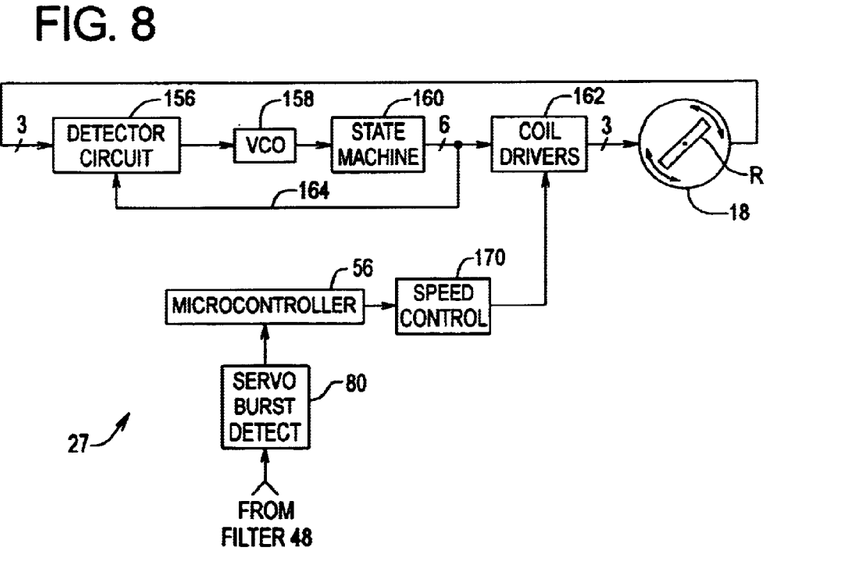
FIG. 8 shows a schematic block diagram of another embodiment of the motor control of FIG. 4 in accordance with principles of the present invention.

FIG. 8 shows a schematic block diagram of another embodiment of the motor control 27 for driving the motor 18, which is a modified version of the block diagram of FIG. 7. As such, like components in FIGS. 7 and 8 are not described again. As shown in FIG. 8, the microcontroller 56 provides the phase-error signal to the speed control 170 for a desired speed of the motor 18, based on the burst phase detected by the servo burst detector 80. Specifically, the burst detector 80 provides burst phase signals to the microcontroller 56, and the microcontroller 56 provides phase-error signals to the speed control 170. In practice, the speed control 170 can be a component of the microcontroller 56.

In cases where the phase difference between the burst fields and the data sampling servo clock 126 is zero, the microcontroller 56 generates a phase-error signal which maintains the speed of the motor 18. However, where the desired burst phase is zero, but the measured burst phase is greater than zero, then the microcontroller 56 generates a phase-error signal to reduce the motor speed and reduce the measured burst phase over the next few burst phase measurements down to the desired level of zero. Similarly, where the measured burst phase is less than zero, then the microcontroller 56 generates a phase-error signal to increase the motor speed and increase the measured burst phase over the next few burst phase measurements up to the desired level of zero. In practice, since changes in the phase measurement provide the best measurement of spindle speed, the steps of converting the phase-error to a speed-error to control drive torque can be combined into a single multi-order controller.

Figure 9A:
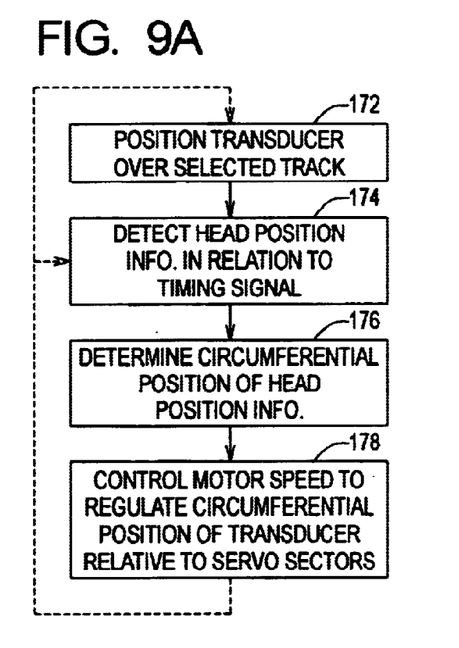
FIGS. 9A–9C show flow diagrams of an embodiment of the steps of a method of controlling a spindle motor speed according to another aspect of the present invention.
Figure 9B:
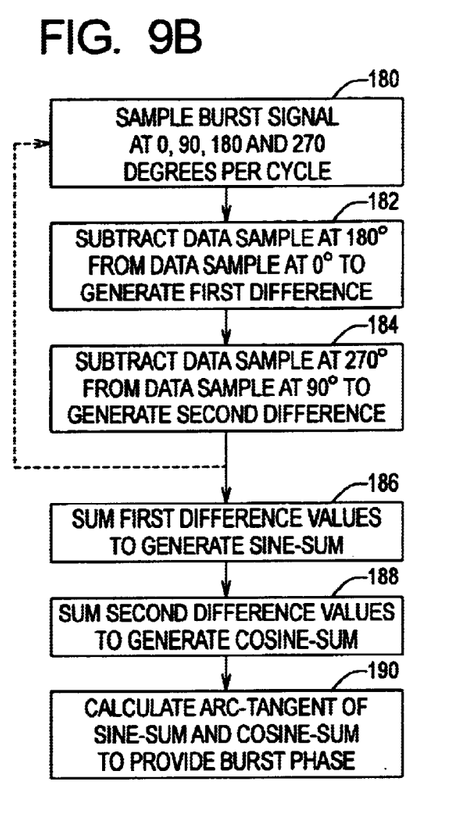
Figure 9C:
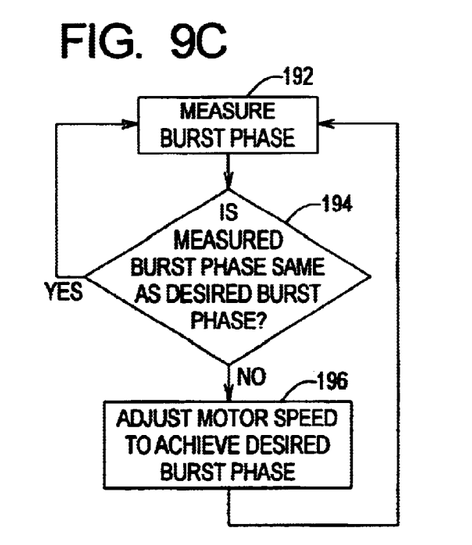

Referring to FIGS. 9A–9C, in another aspect the present invention provides a method for controlling the rotation speed of the spindle motor 18 by performing steps including: positioning the transducer head over a selected track (step 172); detecting the head position information in at least one servo sector on the selected track under the transducer head in relation to a timing signal at a reference frequency (step 174); determining the circumferential position of the detected head position information on the selected track in relation to the timing signal (step 176); and controlling the rotational speed of the spindle motor as a function of said circumferential position, to regulate the circumferential position of the transducer in relation to the servo sectors on the data tracks (step 178).

In one example embodiment, the head position information in each servo sector includes a plurality of circumferential staggered, radially offset servo burst fields, each burst field including one or more cyclical signals recorded at said reference frequency for providing head position information. As such, step 174 can further include the steps of detecting at least one cyclical signal in a servo sector on the selected track via the transducer by sampling the cyclical signal a multiplicity of times for at least one cycle of the cyclical signal at a sampling rate related to the reference frequency to provide data samples and generating a readback signal therefrom.

The step 176 can further include the steps of determining a burst phase of the readback signal relative to the timing signal, where the burst phase comprises the phase-angle between the readback signal and the timing signal. Determining said burst phase can include the steps of performing a single-frequency Fourier transform of the quantized data to provide a phase of the cyclical signal as the burst phase. Referring to FIG. 9B, one example of determining the burst phase by sampling the cyclical signal in step 174 and then performing the Fourier transform in step 176 includes a quadrature process comprising the steps of: sampling the cyclical signal at least at about 0, 90, 180 and 270 degrees per cycle of the cyclical signal (step 180); generating first differences by subtracting the data samples at 180 degrees from the data samples at 0 degrees (step 182); generating second differences by subtracting the data samples at 270 degrees from the data samples at 90 degrees (step 184); summing the first differences to obtain a sine-sum (step 186); summing the second differences to obtain a cosine-sum (step 188); and calculating the sine-sum and the cosine-sum to ascertain said burst phase (step 190).

Step 178 can further include the steps of controlling the rotational speed of the spindle motor to regulate said burst phase, such that the frequency of rotation of the data disk is a function of the reference frequency. Referring to FIG. 9C, in one example embodiment, the burst phase is measured as described above (step 192), the measured burst phase is compared to a desired burst phase (step 194), and the motor speed is regulated to achieve the desired burst phase (step 196). Steps 192–196 are repetitively performed wherein as the transducer head follows a selected track, the head position information in the servo sectors on the selected track are detected and a burst phase is calculated to regulate the spindle speed to achieve the desired burst phase. If the desired burst phase is zero, and a phase difference ("phase-error") is detected due to a non-zero measured burst phase, the motor speed is adjusted in order for the burst phase to reduce to zero, and then the speed is restored in order for the burst phase to remain zero. If the desired burst phase is non-zero, then the motor speed is regulated to adjust the measured burst phase as the spindle rotates to achieve the desired burst phase. The above steps can be programmed into e.g. microcontroller 56 to implement the method of the present invention in conjunction with the component of the PCB 14.

The present invention has been described in considerable detail with reference to certain preferred versions thereof; however, other versions are possible. Therefore, the spirit and scope of the appended claims should not be limited to the description of the preferred versions contained herein.

What is claimed is:

1. A spindle motor control for a disk drive including a spindle motor for rotating a data disk at a desired rotational speed, a data transducer head positionable relative to selected ones of a multiplicity of concentric data tracks formed on a data storage surface of the data disk by a head position actuator structure operating within a head position servo loop, wherein the concentric data tracks are periodically interrupted by a plurality of servo sectors per rotation, each servo sector recorded with head position information, the spindle motor control comprising:

(a) a servo detector for detecting the head position information in at least one servo sector on a selected track under the transducer head in relation to a timing signal at a reference frequency;

(b) a position detector for determining the circumferential position of the detected head position information on the selected track in relation to the timing signal; and (c) a controller for controlling the rotational speed of the spindle motor as a function of said circumferential position, to regulate the circumferential position of the transducer in relation to the servo sectors on the data tracks, wherein the head position information in each servo sector includes servo burst signals recorded at said reference frequency, wherein:

the servo detector detects at least one servo burst signal in a servo sector on the selected track via the transducer head and generates a readback signal;

the position detector further includes a burst phase detector for determining a burst phase of the readback signal relative to the timing signal, said burst phase representing the phase-angle between the readback signal and the timing signal; and the controller controls the rotational speed of the spindle motor to regulate said burst phase, such that the frequency of rotation of the data disk is a function of the reference frequency, wherein each servo burst signal includes at least one substantially cyclical signal at said reference frequency, wherein the servo detector further includes sampling means for sampling the cyclical signal a multiplicity of times for at least one cycle of the cyclical signal at a sampling rate related to the reference frequency to provide data samples such that said readback signal includes said data samples.

2. The motor control of claim 1, wherein the burst phase detector includes means for performing a Fourier transform of the data samples to provide a phase of the cyclical signal as the burst phase.

3. The motor control of claim 2, wherein the means for performing the Fourier transform performs a single-frequency Fourier transform of the data samples at said reference frequency to provide a phase of the cyclical signal as the burst phase.

4. The motor control of claim 1, wherein:

the sampling means samples the cyclical signal N times per cycle of the cyclical signal to provide 0-th through (N−1)-th data samples;

the position detector includes: (1) a first difference means for subtracting the (i+2)-th data samples from the i-th data samples to generate first difference values; (2) a second difference means for subtracting the (i+3)-th data samples from the (i+1)-th data samples to generate second difference values; and (3) accumulator means for summing the first difference values corresponding to said multiple cycles to obtain a sine-sum, and for summing the second differences corresponding to said multiple cycles to obtain a cosine-sum, where i ranges from 0 to (N−1); and the burst phase detector includes means for calculating the arc-tangent of the sine-sum and the cosine-sum to ascertain said burst phase.

5. The spindle motor control of claim 1, wherein the sampling means samples the cyclical signal at least at about 0, 90, 180 and 270 degrees for at least one cycle of the cyclical signal.

6. The spindle motor control of claim 5, wherein:

the position detector includes: (i) a first difference means for subtracting the data sample at 180 degrees from the data sample at 0 degrees to generate a first difference value, and (ii) a second difference means for subtracting the data sample at 270 degrees from the data sample at 90 degrees to generate a second difference value; and the burst phase detector includes means for calculating the arc-tangent of the first and the second difference values to ascertain said burst phase.

7. The spindle motor control of claim 6, wherein:

the sampling means samples the cyclical signal for multiple cycles of the cyclical signal;

the position detector further includes accumulating means for summing the first difference values corresponding to said multiple cycles to obtain a sine-sum, and for summing the second differences corresponding to said multiple cycles to obtain a cosine-sum; and the burst phase detector calculates the arc-tangent of the sine-sum and the cosine-sum to ascertain said burst phase.

8. The motor control of claim 1, wherein the controller controls the rotational speed of the spindle motor to minimize said burst phase.

9. A disk drive comprising:

at least one data disk having a data storage surface;

a spindle motor for rotating the data disk at a desired rotational speed;

at least one data transducer head;

a head position actuator structure, wherein the transducer head is positionable relative to selected ones of a multiplicity of concentric data tracks formed on the data storage surface of the data disk by the head position actuator structure operating within a head position servo loop, wherein the concentric data tracks are periodically interrupted by a plurality of servo sectors per rotation, each servo sector recorded with head position information; and a spindle motor control including: (a) a servo detector for detecting the head position information in at least one servo sector on a selected track under the transducer head in relation to a timing signal at a reference frequency; (b) a position detector for determining the circumferential position of the detected head position information on the selected track in relation to the timing signal; and (c) a controller for controlling the rotational speed of the spindle motor as a function of said circumferential position, to regulate the circumferential position of the transducer in relation to the servo sectors on the data tracks, wherein the head position information in each servo sector includes servo burst signals recorded at said reference frequency, wherein:

the servo detector detects at least one servo burst signal in a servo sector on the selected track via the transducer head and generates a readback signal;

the position detector further includes a burst phase detector for determining a burst phase of the readback signal relative to the timing signal, said burst phase representing the phase-angle between the readback signal and the timing signal; and the controller controls the rotational speed of the spindle motor to regulate said burst phase, such that the frequency of rotation of the data disk is a function of the reference frequency, wherein each servo burst signal includes at least one substantially cyclical signal at said reference frequency, wherein the servo detector further includes sampling means for sampling the cyclical signal a multiplicity of times for at least one cycle of the cyclical signal at a sampling rate related to the reference frequency to provide data samples such that said readback signal includes said data samples.

10. The disk drive of claim 9, wherein the burst phase detector includes means for performing a Fourier transform of the data samples to provide a phase of the cyclical signal as the burst phase.

11. The disk drive of claim 10, wherein the means for performing the Fourier transform performs a single-frequency Fourier transform of the data samples at said reference frequency to provide a phase of the cyclical signal as the burst phase.

12. The disk drive of claim 9, wherein:

the sampling means samples the cyclical signal N times per cycle of the cyclical signal to provide 0-th through (N−1)-th data samples;

the position detector includes: (1) a first difference means for subtracting the (i+2)-th data samples from the i-th data samples to generate first difference values; (2) a second difference means for subtracting the (i+3)-th data samples from the (i+1)-th data samples to generate second difference values; and (3) accumulator means for summing the first difference values corresponding to said multiple cycles to obtain a sine-sum, and for summing the second differences corresponding to said multiple cycles to obtain a cosine-sum, wherein i ranges from 0 to (N−1); and the burst phase detector includes means for calculating the arc-tangent of the sine-sum and the cosine-sum to ascertain said burst phase.

13. In a disk drive including a spindle motor for rotating at least one data disk at a desired rotational speed, and a data transducer head positionable relative to selected ones of a multiplicity of concentric data tracks formed on a data storage surface of the data disk, wherein the concentric data tracks are periodically interrupted by a plurality of servo sectors per rotation, each servo sector recorded with head position information, a method of controlling the rotational speed of the spindle motor, comprising the steps of:

(a) positioning the transducer head over a selected track on the rotating data disk;

(b) detecting the head position information in at least one servo sector on the selected track under the transducer head in relation to a timing signal at a reference frequency;

(c) determining the circumferential position of the detected head position information on the selected track in relation to the timing signal; and (d) controlling the rotational speed of the spindle motor as a function of said circumferential position, to regulate the circumferential position of the transducer in relation to the servo sectors on the data tracks, wherein the head position information in each servo sector includes servo burst signals recorded at said reference frequency, wherein:

step (b) further includes the steps of detecting at least one servo burst signal in a servo sector on the selected track via the transducer head and generating a readback signal;

step (c) further includes the steps of determining a burst phase of the readback signal relative to the timing signal, said burst phase representing the phase-angle between the readback signal and the timing signal; and step (d) further includes the steps of controlling the rotational speed of the spindle motor to regulate said burst phase, such that the frequency of rotation of the data disk is a function of the reference frequency, wherein each servo burst signal includes at least one substantially cyclical signal at said reference frequency, wherein the step of detecting said servo burst signal further includes the steps of sampling the cyclical signal a multiplicity of times for at least one cycle of the cyclical signal at a sampling rate related to the reference frequency to provide data samples such that the readback signal includes said data samples.

14. The method of claim 13 wherein the step of determining said burst phase includes the steps of performing a Fourier transform of the data samples to provide a phase of the cyclical signal as the burst phase.

15. The method of claim 14 wherein the step of performing the Fourier transform includes the steps of performing a single-frequency Fourier transform of the data samples at said reference frequency to provide a phase of the cyclical signal as the burst phase.

16. The method of claim 13 wherein steps (b)–(d) are repetitively performed as the disk rotates under the transducer.

17. The method of claim 13, wherein:

the steps of sampling further include the steps of sampling the cyclical signal N times per cycle of the cyclical signal to provide 0-th through (N−1)-th data samples; and the steps of determining said burst phase includes the steps of:
(i) generating a first difference by subtracting the (i+2)-th data sample from the i-th data sample;
(ii) generating a second difference by subtracting the (i+3)-th data sample from the (i+1)-th data sample, where i ranges from 0 to (N−1); and
(iii) calculating the arc-tangent of the first and the second difference to ascertain said burst phase.

18. The method of claim 17, wherein:

steps (i) and (ii) are repeated for said multiple cycles to generate corresponding multiple first and second differences, and further including the steps of summing the first differences to obtain a sine-sum, and summing the second differences to obtain a cosine-sum; and step (iii) includes steps of calculating the arc-tangent of the sine-sum and the cosine-sum to ascertain said burst phase.

19. The method of claim 18, wherein the steps of sampling the cyclical signal includes the steps of sampling the cyclical signal at about 0, 90, 180 and 270 degrees per cycle of the cyclical signal.

20. The method of claim 13, wherein the steps of controlling the rotational speed of the spindle motor further includes the steps of controlling the rotational speed of the spindle motor to minimize said burst phase.

* * * * *